June 15, 1943.   A. F. ARCIER ET AL   2,322,104
AIRCRAFT TANK CONSTRUCTION
Filed Nov. 16, 1940   3 Sheets-Sheet 3

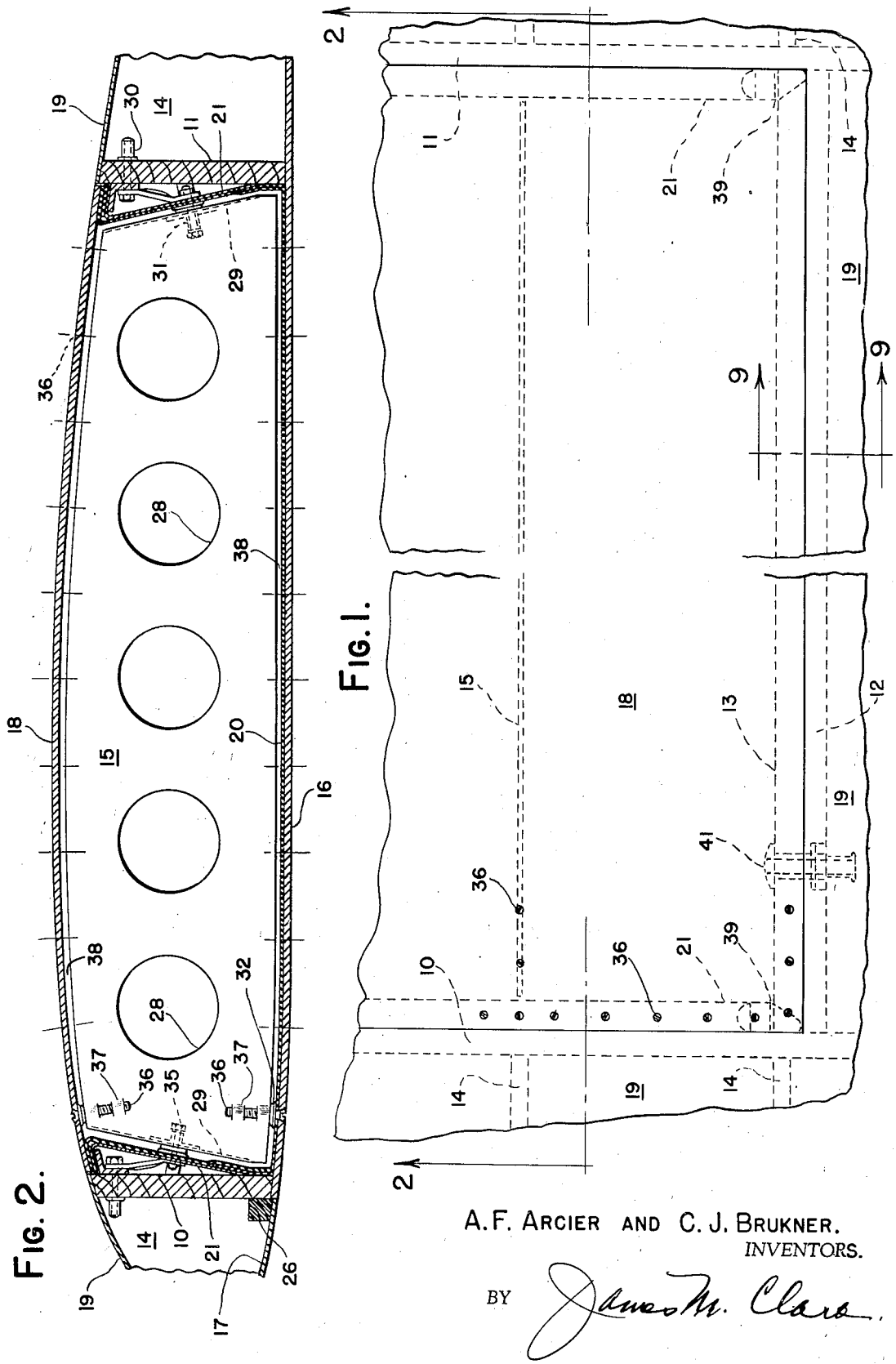

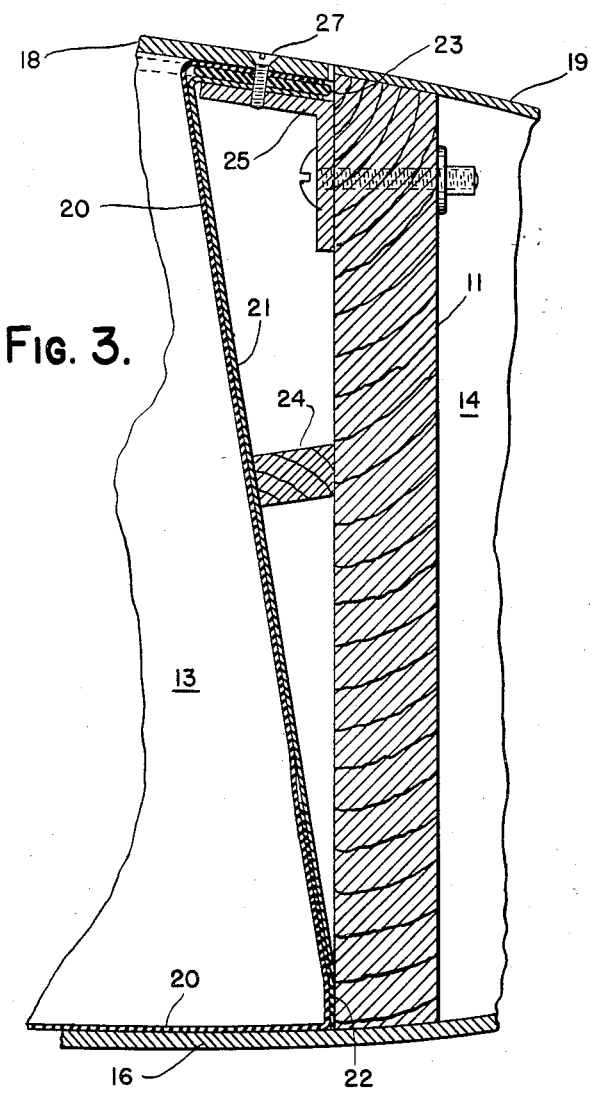
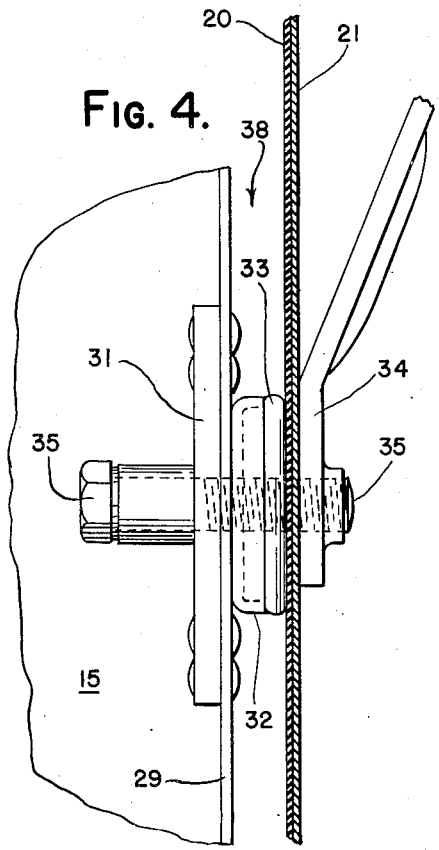
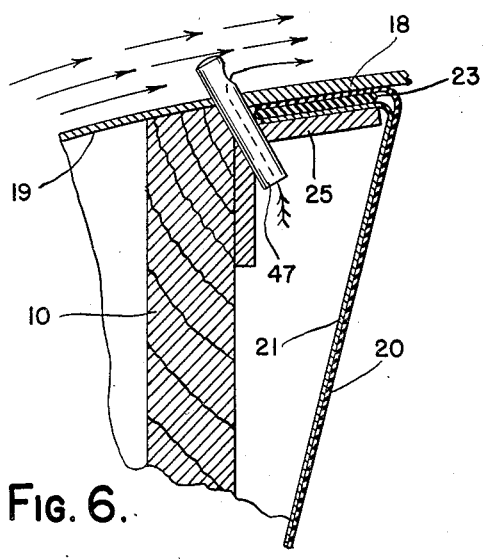
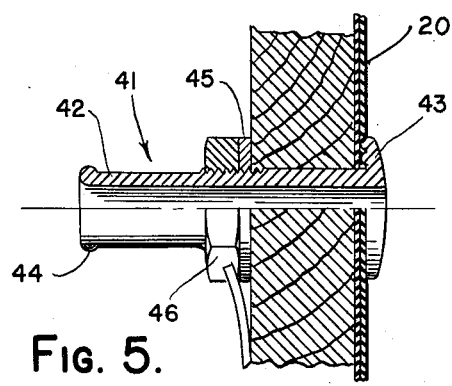
A. F. ARCIER AND C. J. BRUKNER.
INVENTORS.

A. F. ARCIER AND C. J. BRUKNER.
INVENTORS.
BY James M. Clark

Patented June 15, 1943

2,322,104

UNITED STATES PATENT OFFICE 2,322,104

AIRCRAFT TANK CONSTRUCTION

Alex Francis Arcier, Dayton, and Clayton J. Brukner, Troy, Ohio, assignors to Waco Aircraft Company, a corporation of Ohio Application November 16, 1940, Serial No. 365,896

11 Claims. (Cl. 244—135)

The present invention relates to containers and more particularly to integral aircraft tanks for the storage of hydrocarbon fluids such as fuel and oil.

A preferred embodiment of the invention comprises the creation of a liquid-tight container or tank within a structural cell of an aircraft such as in the wing, by a novel lining arrangement internally applied to the structure normally required for the wing. The structural box or cell is rendered liquid-proof by the application of a suitable resistant sealing material, either by spraying or by cementing a pre-coated fabric sheet in place. Suitable lining materials for hydrocarbon containing tanks of the present type have been formed from the materials known generally by the trade names of Neoprene, Kogene and Thiokol. In using a fabric lining the invention embraces a novel method of folding and applying the fabric eliminating all internal seams or joints, all of the edges of the folded sheet being brought outside the tank space and folded outwardly to form a single flat flange against which the cover forms a liquid-tight joint.

Subsequent to the installation of the lining of the tank comprising our invention, any internal structure required to complete the functional integrity of the wing, or other structure, may be installed within the box cell by screwed or bolted fastenings, which are sealed against leakage by novel packing glands of material similar to the lining.

Accordingly, it is a primary object of the present invention to provide an integral lined tank within the cell of an aircraft structure which is lighter and less expensive than similar tanks now in use. It is a further object to provide a novel folded lining for such a tank in which all interior seams or free-end joints are eliminated and a single flanged joint provided at the top, being sealed by the attachment of the cover plate which also forms the aircraft external skin or surface.

Another object of the present invention resides in the novel method of constructing and supporting the tank ends adjacent the spars when the tank is built into the wing. A further object is the provision in such a tank of fastenings provided with gaskets or washers formed from the same, or similar material to the lining, and adapted to seal the contents of the tank both from the shank of the fastening device and the opening thru which it passes thru the lining. Additional objects reside in the provision of an improved container and in its arrangement within an aircraft structure and the novel relationship therewith.

The above and other objects will become apparent to one skilled in the art through the further description of the invention when considered in conjunction with the following drawings wherein like reference characters refer to similar parts. The drawings disclose by way of illustration one manner of effecting the present invention and other modifications are intended to be embraced thereby as more clearly set forth in the following specification and as defined in the appended claims.

In the drawings:

Fig. 1 is a fragmentary plan view of my improved tank built into an airplane wing;

Fig. 2 is a transverse section of the tank taken along the lines 2—2 of Fig. 1;

Fig. 3 is a detail view of the tank at the rear wing spar;

Fig. 4 is an enlarged detail view of the shield suspension fitting at the wing spars;

Fig. 5 shows a detail of the tank outlet thru the wing rib;

Fig. 6 is a detail view of the vent fitting at the front spar;

Figure 7:
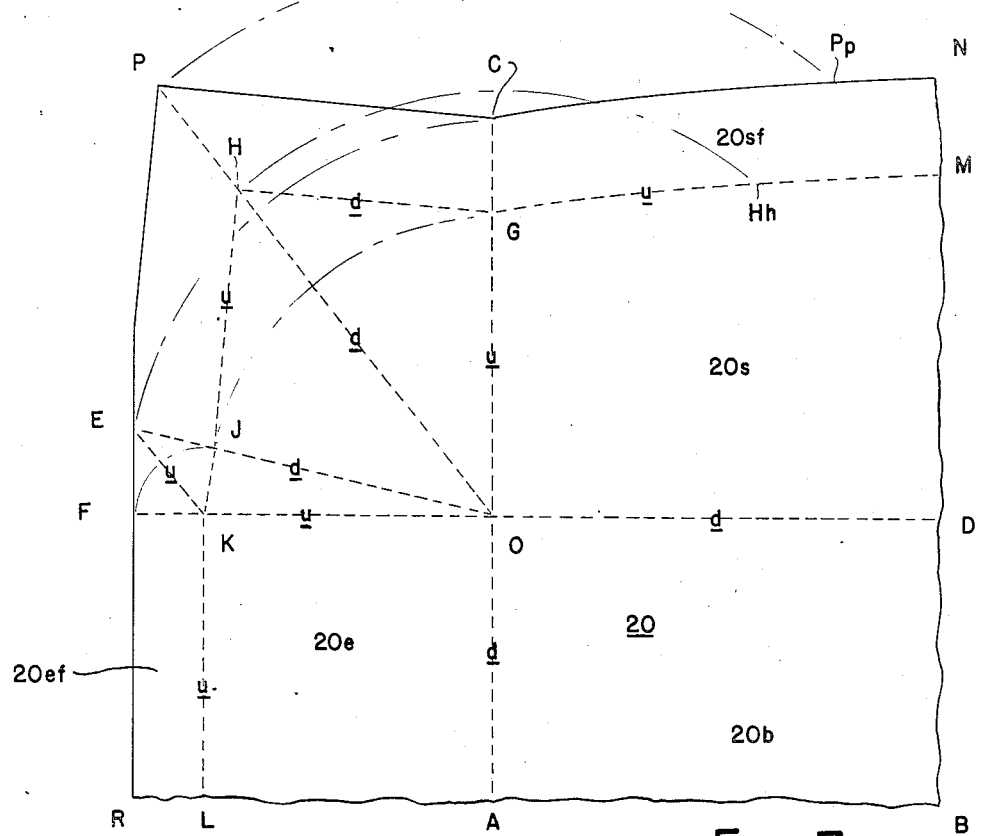
Fig. 7 is a developed view of the lining at a corner of the tank.

Referring to Fig. 1, there is shown in plan a portion of the upper surface of the wing of a relatively light airplane. The wing selected for the preferred showing of my invention is constructed of two wood, or composition, spars covered by plywood, and is typical of wings of this type aircraft in having a profile of considerable chord dimension with respect to its camber, normally being designated as a relatively thin wing. The front or leading edge spar is indicated at the left by the numeral 10 and the rear or trailing spar is designated by 11. The spars have been indicated as of wood construction being substantially rectangular in cross-section and disposed parallel to each other and generally vertical to the mean chord line of the wing, as more clearly shown in Fig. 2. The invention is also applicable to wings of other than wood construction and for larger aircraft than the type selected herewith for explanation.

Ribs or formers of wood construction extend in a chordwise direction from the leading to the trailing edge being interrupted by the spanwise spars 10 and 11, which also preferably form the front and rear ends or limits of the integral tank. The sides of the tank are defined by the wood formers 12 and the plywood side plates 13, forming a composite rib structure extending between the spars, only the inner of such ribs being shown in Fig. 1. A number of shorter ribs 14, of somewhat lesser cross-section extend both forward of the front spar and aft of the rear spar to form the leading and trailing edges respectively. In the inter-spar space occupied by the tank, metal ribs 15 which also serve as tank baffles are provided in alignment with the ribs 14.

The undersurface of the wing is enclosed by a plywood surface 16 extending from the trailing edges, and the aileron and flap surfaces, forwardly to the front spar 10, being suitably fastened to both spars and all of the ribs under which it passes. A plywood undersurface 17 is carried forward from the surface 16, being supported on the front spar cleat 26, and a similar plywood surface 19 extends from the leading to the trailing edges and forms the wing upper surface. The rectangular space between the spars 10 and 11, and the ribs 13 is however provided with an opening thru the upper surface 19 into which a rigid metallic cover plate 18, suitably formed to the wing profile, is removably attached. It should be noted however that the plywood undersurface is permanently attached to the wing structure and as a fixed element serves both as the tank bottom and the lower sustaining surface. The top and bottom faces of the spars are suitably finished to conform to the wing profile.

The integral tank is formed and made liquid-tight by the application of either sprayed film or a pre-impregnated fabric of suitable resistant sealing material. Such materials which have been found suitable are generally known in the art as synthetic rubber forming compounds and are produced under the trade names of Neoprene, Kogene, Thiokol and others. In installations where the liquid proofing film is applied directly to the interior of the wing cell it may be accomplished either by application in liquid form or by a suitable hot spraying method such as the Schori process, in which case it is preferable to build up or vary the thickness of the applied film in order that sufficient resilience is obtained at those areas subject to the greatest stress and wear. It is also desirable in such methods to build the internal structure such as the inter-spar ribs, baffles, fittings and the like before the liquid-proofing is applied inasmuch as all internal surfaces are then film-coated with the selected resistant, resilient material.

In the preferred embodiment of the tank as selected for purposes of explanation, the tank is liquid-proofed by a single sheet of treated fabric or similar pliant and resistant material 20 which forms the tank lining for the four sides and bottom of the tank. Metal end shields 21 in the general form of the numeral 7 are attached to the inner faces of the spars 10 and 11, the shorter legs or flanges being supported upon similar outstanding legs of the structural angle 25 suitably fastened to the upper portions of the spars. The lower ends of the end plates 21 extend outwardly from the inside of the tank cell terminating at the spar inner faces and having their intermediate portions supported and spaced from the spars by the stringers 24 as more clearly shown in Fig. 3. The adjacent faces of the outstanding and oppositely extending flanges of the plates 21 and the angles 25 meet in a plane spaced somewhat below, but parallel to the cambered upper surface of the wing. The upper surface of the end ribs 12 are also finished to lie in the same cambered plane referred to and flush at each corner of the tank with the adjacent upper faces of the plates 21.

Figure 9:
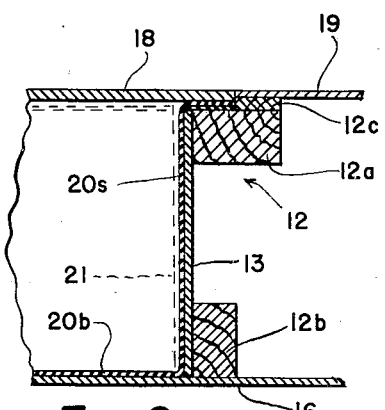
Fig. 9 is a section of the tank side taken along the lines 9—9 of Fig. 1.

The upper faces of the adjacent rib faces are raised by the spacers 12c to come flush top at their ends with the spars 10 and 11 in order to receive the relatively thinner plywood upper surface 19, as more clearly shown in Fig. 9. A resilient cushioning strip 23, is cut and fitted upon the flanges of plates 21 and also upon the upper surfaces of the upper rib formers 12a. Reinforcing strips 22 of resilient and resistant material are cemented to the depending portions of the plates 21 to cover the junctions of the metal plates with the spars 10 and 11. An integral cell or box of relatively shallow but varying depth and large area, having squared sides and sloping or bevelled ends has now been formed within the wing structure. A suitably large sheet of the flexible material as described above is then folded to form the lining 20 and the flanged seat portion all in a single piece.

Figure 8:
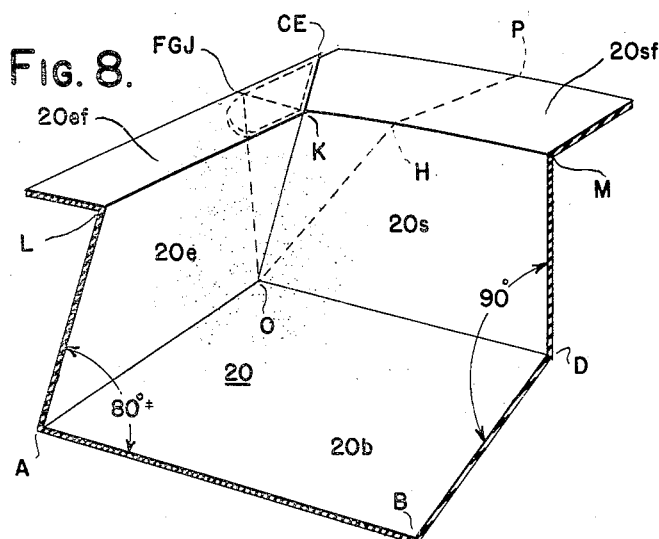
Fig. 8 is a perspective view of the lining folded to form a flanged corner.

A major feature of the present invention resides in the provision of a single piece of folded lining forming all four sides, the bottom and the co-planar flange top without any free edges of the original sheet terminating in any of these surfaces of the tank or of the flanged top. Thus a seamless lining is formed in which only folds of endless material come within the tank. A corner of the sheet before folding is shown in Fig. 7 and the completely folded corner is shown in Fig. 8. The remaining corners are similar to the one shown with the exception that they are either folded over symmetrically in the opposite direction, or to the particular dimensions which prevail due to the vertical thickness of the wing at those corners, it being borne in mind that the usual aircraft wing may diminish in thickness both outwardly and rearwardly from a given reference line.

It will be noted that each corner of the lining is formed by a side 20s intersecting the bottom 20b normal, or at right angles thereto, and by a sloping end 20e causing the tank to be of greater chordwise dimension at the bottom than at the top, the angle of slope of the ends in the embodiment shown being approximately 80 degrees.

The outline of the flat stock sheet is suitably scribed or marked out, as from a master templet, and each of the points indicating the dotted fold lines in Figs. 7 and 8 are similarly located. The sheet is then cut along its periphery to suit the scribed outline indicated by the edges NC and RE both terminating at the corner point P, it being understood that four similar corner folds are made on the same single original sheet and that but one corner is shown broken along the lines RLAB and NMDB merely for convenience in explaining the invention. Each of the dotted lines in Fig. 7 indicates a fold and the letters u and d appearing on each fold indicate the direction of the fold namely, u indicates an upward fold or crease in which the adjacent sides are forced downwardly away from the plane of the paper on which the figure appears. Similarly the letter d indicates a downwardly pressed crease in which the adjacent side areas are rotated upwardly toward the eye of the reader.

The first step provides for the downward folding of the crease OHP and bringing together the upwardly folded crease OGC and the crease OJE such that the points C and G coincide respectively with points E and J; at the same time the areas 20s and 20e are folded upwardly about the downwardly creased lines OD and OA to form the side and end of the lining respectively. The corresponding creases OGC and OJE, now coincide with each other and are partly folded together until the doubled triangular portions OPC and OPE on each side of the crease OHP are brought behind the vertical side 20s as indicated by the dotted lines OH and HP in Figure 8. In this position it is noted that the creases GH and JH, which were brought into coincidence with each other when the crease OHP was folded downwardly, now fall behind the crease MG and are adapted to be folded therewith upwardly, or inwardly toward the tank. At this stage in the folding operations the remaining three corners are similarly folded with the result that an open top container with four walls or sides, and a flat bottom has been formed.

The next step involves the forming of the two sloping end walls, which is accomplished by folding the triangular area OFE inwardly about the crease OJE until this area meets the side 20s which has simultaneously been pulled upwardly until it assumes an upright or vertical position with respect to the bottom 20b. In order to form the flange portions, the end flange 20e' and the side flange 20sf are each bent or folded simultaneously outward and downward about their respective upward creases LK and MG. The edge FK which heretofore butted against the area 20sf now falls back, unfolds and lies in the plane of the flange in the region of the extended edge MG. Both flanges meet at the corner with the portion KFE, resulting from the diagonal fold KE of the end flange, overlying the three thicknesses of the side flange, beneath KEJ.

It should be noted at this point that all of the edges of the original flat sheet now terminate at the outer edges of the flanges and the tank lining is, therefore, seamless in the sense that no joining of the material occurs within the receptacle. Accordingly any fluid passing from within the tank thru the sloping corner KO and thru the corner fold at OJG would necessarily have to find its way up to the flange 20sf around the inside corner MG and to the outer edge of the flange before it could escape between the folds of the lining. Such leakage is prevented by the tightly clamped cover 18 and the fastening screws 27 which compress the lining flanges against the cushioning strip 23. The cover plate 18 is preferably of a light but strong material such as magnesium, aluminum alloy or the like, and due to its rigidity and the cushioning effect of the resilient strip 23 compensating for fadeout of bolting pressures due to deflection of the connected parts, relatively few fastening bolts have been found necessary to provide a liquid tight joint.

Figures 10, 11:
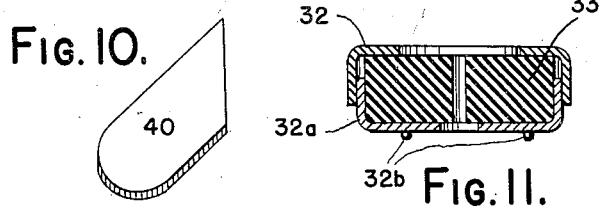
Fig. 10 is an enlarged view of a bridging piece used in the folding operation.
Figure 11 is an enlarged view in section of a modified form of washer.

The sloping metal end plate 21 terminates just short of meeting the wood side sheets 13 permitting the latter to abut against the spars 10 and 11. The intervening space, as shown at 39 in Fig. 1, provides for the insertion of the triangular folded portion KOJ of the lining 20, being the outward extension of the side 20s. A bridge piece 40, of thin sheet metal and approximately the width of the flange, is inserted between the surface JEK and the flange 20ef and across the gap between the sheet 13 and the plate 21 to prevent deflection, failure and subsequent leakage in the region of the straightened crease FK. This bridge element as shown in Fig. 10 is preferably rounded at one end and diagonally cut at the other to fit within the fold KE.

Before inserting the lining the tank faces of the structural cell preferably are first sprayed or otherwise covered with a coating of neoprene, or like material, for the adherence of the lining to its enclosing structure, altho this has not been found absolutely necessary as the fastening means for the interior structure about to be described serves to adequately anchor the lining in position. Also before the lining 20 is installed the link fittings 34 are suspended from the spar flange angles 25 by means of the through bolts 30, and the lining and plates 21 are scribed and provided with holes to match the tapped holes in the lower ends of the link fittings. The metal ribs 15 are provided with end flanges 29 to which are riveted the T fittings 31 suitably bored for the fastening bolts 35. A fluid circulating space 38 is provided between the rib edges and the inner faces of the tank, and between the flanges 29 and the lining 20 are inserted novel gasketed washers 32 which prevent leakage of the contained fluid through the openings for the bolts 35.

Each washer 32 comprises an annular cup shaped element 32 of aluminum alloy, or similar light metal, having an opening slightly larger than the bolt diameter and a flanged outer rim embracing a neoprene, or like, annular disc 33. The latter has an opening considerably smaller than the bolt or screw diameter and as it is compressed between the washers and the opposed plate or lining the rubber-like material is distorted making a fluid-tight connection against both the lining and the bolt shank. These gasketed fittings also serve to resiliently attach the parts such that vibrations are damped out and the life of the tank thereby increased. A modified form of washer, as shown in Fig. 11, is used for making the blind connections thru the top plate 18 to the tapped holes in the metal ribs 15. Two-cup-shaped elements 32 and 32a are of different diameters such that the latter telescopes freely in opposite relationship within the former, enclosing both sides of the resilient disc 33. The element 32a is provided with one or more lugs 32b on its outer surface integrally formed thereon during the pressing or stamping process. These lugs engage the edge of the rib or baffle plate 15 and serve to prevent rotation of the gasketed washer and its attendant damage to the resilient material and the tightness of the joint. The central opening of the outer washer is larger than that bearing the lugs and as the two are drawn together the still smaller opening in the resilient disc embraces the shank of the screw. The disc 33 is also deformed or distorted thru the large central opening in the washer 32 and forms a fluid-tight seal against the cover 18 and the opening therein. The baffle ribs 15 are preferably provided with lightening holes 28 and may be stiffened by chordwise beads, flanges or corrugations. These ribs are also provided with stamped nut halves 37 into which female threads have been stamped in the oppositely facing alternate portions to receive the screws 36.

In Fig. 6 there is shown a novel method of preventing the collapse of the tank lining as the tank is emptied during flight, and also for expediting its refilling. Since the tank is co-extensive with the upper and lower surfaces of the wing its external surfaces are subject to the net aerodynamic pressures between these surfaces. Even though the fixed skin covering is installed in a reasonably air tight manner vibrations and flight conditions invariably cause deflections and slight openings in the joints permitting aerodynamic pressure to be exerted within the wing interior. Inasmuch as the cover 18 is rigid the pressure exerted upon, and finding its way thru the lower surface 16, tends to collapse and separate the lining 20 from its enclosing structure, whether the lining is cemented or merely attached by the separated fastenings. This tendency of the lining to collapse or breathe would normally cause a considerable problem in the refilling of the tank in the event the collapsed lining would have to expel the infiltrated air thru such small and limited vents by means of the slight pressure differential caused by the shallow fuel head in the tank. These objections have all been satisfactorily overcome by the provision of the small tubular vents 47 which are inserted thru the upper surface and the flange angle 25 having their outer openings facing rearwardly with respect to the high speed air, indicated by the tailless arrows, flowing rearwardly over the upper surface. A suction flow is caused, drawing air from the space within the wing cell but outside the lining as indicated by the tailed arrow shown in Fig. 6. This keeps the lining in its proper position against the supporting walls regardless of pressure variations due to flight conditions or variations in fuel level in the tank.

The tank outlet connection is shown in Fig. 5 in which the tubular outlet 41 has a cylindrical body 42 adapted for a finger type strainer. The flange or head 43 is suitably recessed to engage the resilient lining 20 in a liquid-tight manner, being held in place by the nut 46 and the washer 45. A bulb 44 on the outer end of the shank 42 is adapted for the connection of the fuel hose, or tubing.

It will be noted that a relatively light integral fuel tank has been formed by the insertion of a one-piece lining and side sheets and fittings of relatively light weight. The stresses imposed upon the bottom due to the weight of the fluid contents, are substantially equalized in flight by the lift forces, and are otherwise transmitted to the uninterrupted interior ribs 15. In transmitting these rib loads to the spars 10 and 11 it will be noted that this is accomplished by means of the end link fittings 34 thereby preventing the reactions at the rib terminals from tending to pull the lining downwardly and out of the flanged joint at the cover. The latter also carries all he necessary filler caps, vent, gauge and other fittings, the entire cover being removable at any time, giving complete access to the tank interior. A notable feature of this construction is that all attachmens are on the outside and may be readily inspected or tightened from the outside. It may, therefore, be seen that the present structure provides a means of employing any desired amount of internal structures without resulting in costly complications or assembly difficulties. In the case of comparatively thin wings, housing tanks of comparatively large plan area, this method of construction derives notable weight and cost savings over prior practice.

Other modifications of the present invention, for which a preferred form has been shown and described, will become apparent to those skilled in the art, but all are intended to be embraced thereby and as more particularly defined by the appended claims.

We claim:

1. In aircraft tank construction, a wing having leading and trailing spars and spanwise spaced interspar elements forming a cellular receptacle therebetween, the wing undersurface forming the bottom of said receptacle, a single sheet of fluid resistant flexible material folded to form a lining for the sides and bottom of said receptacle and an outwardly extending flange at its upper periphery, and a rigid removable cover adapted to engage said flange in fluid-tight relationship and serve as a portion of the exterior surface of said wing.

2. In aircraft tank construction, a swing, an integral tank formed by the internal cellular structure of said wing and a one-piece lining of rubber-like sheet material supported within said wing structure, the said lining folded to form a bottom in contact with the lower skin surface, a plurality of side surfaces and a continuous outwardly extending flange at its upper periphery, the corners of said receptacle lining being folded such that all of the free edges of the original sheet are located at the outer edge of said flange remote from the contents of said tank.

3. In aircraft construction, a wing having a rigid framework forming a receptacle of varying depth, an opening in the upper surface of said wing the framework at the periphery of said opening having a continuous recess, a sheet of pliant material folded to form a seamless lining for the sides and bottom of said receptacle and with all of its free edges flanged over into said recess and a rigid closure for the said opening adapted to detachably engage the lining flange at said recess and to form therewith an integral fluid container, said lining and closure being independently incapable of use as a fluid container.

4. In an aircraft wing tank, a spanwise structural member, upper and lower wing surfaces supported thereby, an element defining a side wall of said tank supported from the side of said member, a seamless elastic lining extending from the upper portion of said member, around the inner faces of said element and on the top of the lower surface of the wing, a rib within said tank extending transversely to said member and fluid-tight means connecting said rib to said member thru said wall and lining.

5. In an aircraft wing tank, a wing spar, a lower surface supported therefrom, a flange formed along an upper edge of the spar, a sheet element bent for engagement with said flange at its upper extremity and suspended therefrom to form a tank wall, pliant fluid-resistant material applied by spraying to the interior of said wall and wing lower surface, a rib within said tank extending transversely to said wall and fluid-tight means extending thru said wall adapted to support said ribs from said spar.

6. An aircraft tank within a rigid wing structure, comprising a fluid-tight composition lining applied to the inside of said structure, an internal structural element within said tank and fluid-tight means passing thru said lining for attachment of said element to said structure, said means comprising a cup-shaped element embracing an apertured disc of flexible material and a centrally-disposed attachment device having a shank larger than said aperture adapted to press the said disc against said lining and attachment in fluid-tight relationship.

7. In an aircraft tank having a pliant fabric lining, attachment means for connecting parts thru said lining, comprising an apertured rigid washer having a circular flange, and apertured pliant disc embraced by said washer and screw means of greater diameter than said disc aperture passing thru an aperture in said lining adapted to deform said disc between said washer and said lining whereby said screw means and the lining aperture are rendered fluid tight.

8. In an aircraft tank, a rigid wing structure having an internal cell, a pliant lining applied to said internal cell and means for sealing an attachment extending thru said lining comprising a cylindrical disc of deformable material having a central aperture, a cup-shaped washer embracing a face and a peripheral edge of said disc, said washer having an aperture, the said attachment having a shank of greater diameter than the aperture in said disc, and a second apertured washer adapted to telescopically engage said first washer whereby further telescopic movement of said washers by said attachment causes deformation of said disc thru an aperture of one of said washers and to form a liquid-tight seal against said lining and against the shank of said attachment, the other of said washers being provided with a plurality of projections whereby its rotation is prevented while in contact with the attachment element.

9. In an aircraft wing having upper and lower surfaces, a rigid framework in said wing, a lining inwardly disposed within said wing framework and surfaces forming an integral lined tank, being independently incapable of use as a tank, and means for relieving air pressure from within said wing due to flight pressures on the lower surface, said means compressing vents thru said upper surface and disposed exteriorly of said tank lining.

10. In aircraft tank construction, a wing having leading and trailing spars and spanwise spaced interspar elements forming a cellular receptacle therebetween, the wing undersurface forming the bottom of said receptacle, a lining for an integral tank formed within said cellular receptacle comprising a rectangular sheet of foldable material having score lines defining a central bottom with contiguous sides, ends and peripheral flanges and intervening diagonal fold lines between the sides and ends and extending through said flanges whereby on being folded all of the free edges of said sheet lie adjacent the free edges of said flanges and the said bottom walls and sides are seamless.

11. In aircraft construction the method of forming an integral tank within an aircraft body comprising the construction of a cellular receptacle formed by rectangularly disposed horizontal structural elements of the framework of said body and a lower surface of said body joining the said rectangularly disposed elements, applying a pliant coating on the interior surfaces of said cellular receptacle comprising the opposed vertical surfaces of said rectangularly arranged structural elements and the upper face of said lower body surface and applying a rectangularly shaped closure element above the opening in said cellular receptacle, fastening the same to the upper surfaces of said rectangularly arranged structural elements such that said closure forms a continuous upper surface of the said aircraft body.

ALEX FRANCIS ARCIER.
CLAYTON J. BRUKNER.

Certificate of Correction

Patent No. 2,322,104. June 15, 1943.

ALEX FRANCIS ARCIER ET AL.

It is hereby certified that errors appear in the printed specification of the above numbered patent requiring correction as follows: Page 1, second column, line 6, after the word "in" strike out the comma; page 3, first column, line 34, for the indistinct reference character after the word "flange" read *20ef*; page 4, first column, line 59, for "he" before "necessary" read *the*; line 63, for "attachmens" read *attachments*; and second column, line 17, claim 2, for "swing" read *wing*; and that the said Letters Patent should be read with these corrections therein that the same may conform to the record of the case in the Patent Office.

Signed and sealed this 18th day of November, A. D. 1947.

[SEAL]

THOMAS F. MURPHY,
*Assistant Commissioner of Patents.*